US009001951B1

(12) United States Patent
Kumpulainen

(10) Patent No.: US 9,001,951 B1
(45) Date of Patent: Apr. 7, 2015

(54) TECHNIQUES FOR TRANSFERRING TIME INFORMATION BETWEEN CLOCK DOMAINS

(75) Inventor: Pasi Kumpulainen, Vantaa (FI)

(73) Assignee: Altera Corporation, San Jose, CA (US)

( * ) Notice: Subject to any disclaimer, the term of this patent is extended or adjusted under 35 U.S.C. 154(b) by 656 days.

(21) Appl. No.: 13/329,188

(22) Filed: Dec. 16, 2011

(51) Int. Cl.
H04L 7/00 (2006.01)
H04L 25/00 (2006.01)
H04L 25/40 (2006.01)
H04L 25/38 (2006.01)

(52) U.S. Cl.
CPC .................................. H04L 25/38 (2013.01)

(58) Field of Classification Search
USPC ............................. 375/371–376; 327/141–161
See application file for complete search history.

(56) References Cited

U.S. PATENT DOCUMENTS

| 2008/0075217 | A1 | 3/2008 | Ilnicki et al. | |
| 2009/0220036 | A1* | 9/2009 | Witters et al. | 375/354 |
| 2011/0170534 | A1 | 7/2011 | York | |
| 2013/0038352 | A1* | 2/2013 | Gupta et al. | 327/20 |

OTHER PUBLICATIONS

Reinhard Exel and Patrick Loschmidt, "High Accurate Timestamping by Phase and Frequency Estimation," ISPCS 2009 International IEEE Symposium on Precision Clock Synchronization for Measurement, Control and Communication Brescia, Italy, Oct. 12-16, 2009, pp. 126-131.
Wikipedia, the free encyclopedia, "Precision Time Protocol," Oct. 6, 2011, pp. 1-10.
Clifford E. Cummings, "Simulation and Synthesis Techniques for Asynchronous FIFO Design," Expert Verilog, SystemVerilog & Synthesis Training, SNUG San Jose 2002, pp. 1-23.

* cited by examiner

Primary Examiner — Curtis Odom
(74) Attorney, Agent, or Firm — Steven J. Cahill

(57) ABSTRACT

A circuit includes a logic circuit, first and second storage circuits, a timing detection circuit, and a compensation circuit. The logic circuit generates a digital value in response to a first periodic signal. The first storage circuit stores time information in response to a second periodic signal. The second storage circuit stores the digital value in response to the second periodic signal. The timing detection circuit generates a detection signal indicating a timing difference between the first periodic signal and the second periodic signal based on the digital value. The compensation circuit generates adjusted time information based on the time information stored in the first storage circuit and the detection signal.

22 Claims, 10 Drawing Sheets

TECHNIQUES FOR TRANSFERRING TIME INFORMATION BETWEEN CLOCK DOMAINS

TECHNICAL FIELD

The present invention relates to electronic circuits, and more particularly, to techniques for transferring time information between clock domains.

BACKGROUND

A wireless telecommunications system typically includes a baseband unit and one or more radio units. A slave clock signal in the radio unit is synchronized to a master clock signal in the baseband unit. The Common Public Radio Interface (CPRI) standard and the Open Base Station Architecture Initiative (OBSAI) interface standard provide techniques for synchronizing clock signals in the baseband and radio units in frequency and in phase. Communication links that are designed according to one of the Ethernet standards are generally less expensive than communication links designed according to the CPRI or OBSAI standards. However, most Ethernet standards do not support phase or frequency synchronization across a wireless communication link.

BRIEF SUMMARY

According to some embodiments, a circuit includes a logic circuit, first and second storage circuits, a timing detection circuit, and a compensation circuit. The logic circuit generates a digital value in response to a first periodic signal. The first storage circuit stores time information in response to a second periodic signal. The second storage circuit stores the digital value in response to the second periodic signal. The timing detection circuit generates a detection signal indicating a timing difference between the first periodic signal and the second periodic signal based on the digital value. The compensation circuit generates adjusted time information based on the time information stored in the first storage circuit and the detection signal.

Various objects, features, and advantages of the present invention will become apparent upon consideration of the following detailed description and the accompanying drawings.

DETAILED DESCRIPTION

Precision Time Protocol (PTP) is a protocol defined as part of the IEEE 1588 standard that provides a method to precisely synchronize clock signals throughout a computer network. The IEEE 1588 standard may be used with a Synchronous Ethernet standard to achieve both phase and frequency synchronization between network elements in a telecommunications system using time stamping.

According to some embodiments, the Synchronous Ethernet standard and the IEEE 1588 standard are applied to a wireless or wired telecommunications system having a baseband unit and at least one radio unit. The time stamping feature of the IEEE 1588 standard is used to synchronize a slave clock signal in the radio unit with a master clock signal in the baseband unit. The radio unit synchronizes the slave clock signal with the master clock signal in phase and in frequency. In some embodiments, multiple slave clock signals in multiple radio units can synchronize to a single master clock signal in the baseband unit.

The baseband unit provides a synchronization message to the radio unit through a wireless or wired communication link at regular intervals. The baseband unit generates a time stamp T1 using the master clock signal that indicates the time of day that the synchronization message was sent to the radio unit. The time stamp T1 is also sent to the radio unit. The radio unit generates a time stamp T2 using the slave clock signal indicating the time of day that the radio unit received the synchronization message. T2−T1 indicates the delay from the baseband unit to the radio unit through the communication link.

The radio unit then sends a delay request message to the baseband unit through a communication link. The radio unit generates a time stamp T3 using the slave clock signal indicating the time of day the delay request message was sent to the baseband unit. The baseband unit generates a time stamp T4 using the master clock signal that indicates the time of day that the baseband unit received the delay request message. The baseband unit then sends time stamp T4 to the radio unit. T4−T3 indicates the delay from the radio unit to the baseband unit. The radio unit uses the offset $O=((T2-T1)-(T4-T3))/2$ to synchronize the frequency and the phase of its slave clock signal to the master clock signal in the baseband unit.

Wireless telecommunications systems generally use very high accuracy time stamping between the baseband and radio units. Any uncertainty in the delay measurement of the time stamping transferred between the baseband and radio units decreases the accuracy of the clock signal synchronization of the wireless telecommunications system. Embodiments of the present invention as described below can provide high accuracy time stamping between baseband and radio units in a wireless or wired telecommunications system.

Figure 1:
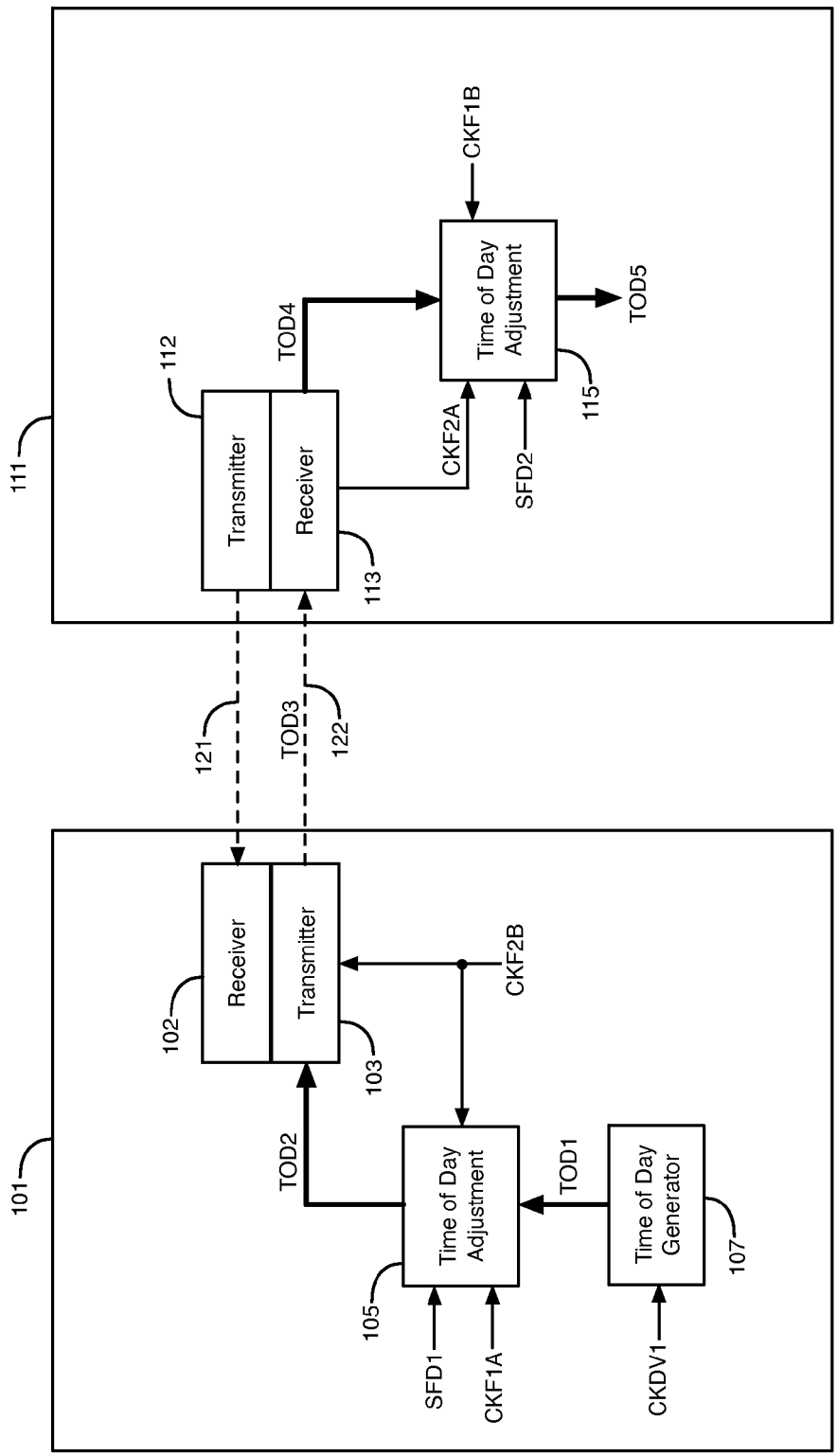
FIG. 1 illustrates an example of a telecommunications system, according to an embodiment of the present invention.

FIG. 1 illustrates an example of a telecommunications system, according to an embodiment of the present invention. The telecommunications system of FIG. 1 includes a unit 101 and a unit 111. In one embodiment, unit 101 is a baseband unit and unit 111 is a radio unit. In another embodiment, unit 101 is a radio unit, and unit 111 is a baseband unit. Units 101 and 111 may communicate with each other through wireless communication links or through wired communication links.

Unit 101 includes a receiver circuit 102, a transmitter circuit 103, a time of day adjustment circuit 105, and a time of day generator circuit 107. Unit 111 includes a transmitter circuit 112, a receiver circuit 113, and a time of day adjustment circuit 115. Unit 101 and unit 111 communicate through communication links 121 and 122. Communications links 121 and 122 may be wireless links or wired links.

According to an embodiment of the telecommunications system of FIG. 1, units 101 and 111 implement the Synchronous Ethernet standard and the IEEE 1588 standard. In this embodiment of FIG. 1, the time stamping feature of the IEEE 1588 standard is used to achieve phase and frequency synchronization between a master clock signal CKF1A in unit 101 and a slave clock signal CKF1B in unit 111, as described above. In this embodiment, unit 101 is a baseband unit, and unit 111 is a radio unit. Time of day generator circuit 107 generates signals TOD1 that indicate the time of day T1 or T4, according to the time stamping feature of the IEEE 1588 standard, as described above. The time of day indicated by signals TOD1 includes time information at any suitable level of precision, for example, fractions of nanoseconds, nanoseconds, microseconds, milliseconds, seconds, minutes, hours, AM/PM, day of the month, month, and/or year. As an example that is not intended to be limiting, the TOD1 signals may include 64 parallel signals. Time of day generator circuit 107 generates signals TOD1 that indicate the time of day in response to a clock signal CKDV1. Signals TOD1 are synchronized with clock signal CKDV1. The frequency of clock signal CKDV1 is selected based on the transmission standard implemented by the telecommunications system of FIG. 1. As an example that is not intended to be limiting, the frequency of clock signal CKDV1 may be 30.72 MHz. The clock signals described herein are periodic signals.

Signals TOD1 are provided in parallel from time of day generator circuit 107 to inputs of time of day adjustment circuit 105. Clock signal CKF1A, clock signal CKF2B, and control signal SFD1 are provided to additional inputs of time of day adjustment circuit 105. The frequency of clock signal CKF1A is a product of the frequency of clock signal CKDV1 times an integer. As an example that is not intended to be limiting, if the frequency of clock signal CKDV1 is 30.72 MHz, the frequency of clock signal CKF1A may be 245.76 MHz (i.e., 8×30.72 MHz).

Time of day adjustment circuit 105 generates output signals TOD2 based on input signals TOD1. Output signals TOD2 indicate the time of day as indicated by signals TOD1 plus a timing offset. The timing offset is based on a timing difference between clock signals CKF1A and CKF2B. In response to control signal SFD1 being asserted, time of day adjustment circuit 105 converts the time of day indicated by signals TOD1 from the clock domain of clock signal CKF1A to the clock domain of clock signal CKF2B to generate output signals TOD2. Signals TOD2 are synchronized with clock signal CKF2B. Details of an embodiment of time of day adjustment circuit 105 are shown in and described below with respect to FIG. 2.

Signals TOD2 are provided in parallel to inputs of transmitter circuit 103. Clock signal CKF2B is provided to an input of transmitter circuit 103. Transmitter circuit 103 generates signal TOD3 based on signals TOD2 using a parallel-to-serial converter that is clocked by clock signal CKF2B. Transmitter circuit 103 causes signal TOD3 to indicate the same time of day that is indicated by signals TOD2. Transmitter circuit 103 synchronizes signal TOD3 with clock signal CKF2B.

Transmitter circuit 103 transmits signal TOD3 in serial to unit 111 through communication link 122 using an Ethernet standard. The frequency of clock signal CKF2B is based on the Ethernet standard used by transmitter circuit 103. The frequency of clock signal CKF2B may not be a multiple of the frequency of clock signal CKDV1, because the frequencies of clock signals CKF2B and CKDV1 are based on two different network standards. As an example that is not intended to be limiting, the frequency of clock signal CKF2B may be 257.8125 MHz, and the frequency of clock signal CKDV1 may be 30.72 MHz.

Signal TOD3 is provided through communication link 122 to an input of receiver circuit 113 in unit 111. Receiver circuit 113 generates parallel signals TOD4 based on serial signal TOD3 using a serial-to-parallel converter. Receiver circuit 113 causes signals TOD4 to indicate the time of day that is indicated by signal TOD3. Receiver circuit 113 includes a clock data recovery circuit. The clock data recovery circuit generates a recovered clock signal CKF2A based on signal TOD3. The recovered clock signal CKF2A has the same frequency as clock signal CKF2B. Signals TOD4 are synchronized with clock signal CKF2A. Signals TOD4 and clock signal CKF2A are provided to inputs of time of day adjustment circuit 115.

Control signal SFD2 and clock signal CKF1B are also provided to inputs of time of day adjustment circuit 115. The frequency of clock signal CKF1B should be a product of the frequency of clock signal CKDV1 times an integer, which is selected based on the transmission standard. As an example that is not intended to be limiting, if the frequency of clock signal CKDV1 is 30.72 MHz, the frequency of clock signal CKF1B may be set to 245.76 MHz (i.e., 8×30.72 MHz). In an embodiment, each of signals SFD1 and SFD2 is a start of frame delimiter signal that marks the beginning of an Ethernet packet. Signals SFD1 and SFD2 trigger a time adjustment process in time of day adjustment circuits 105 and 115, respectively.

Time of day adjustment circuit 115 generates output signals TOD5 based on input signals TOD4. Output signals TOD5 indicate the time of day as indicated by signals TOD4 plus a timing offset. The timing offset is based on a timing difference between clock signals CKF1B and CKF2A. In response to control signal SFD2 being asserted, time of day adjustment circuit 115 converts the time of day indicated by signals TOD4 from the clock domain of clock signal CKF2A to the clock domain of clock signal CKF1B to generate output signals TOD5. Signals TOD5 are synchronized with clock signal CKF1B. Details of an embodiment of time of day adjustment circuit 115 are shown in and described below with respect to FIG. 2. Unit 111 also includes a transmitter circuit 112 that transmits a signal to receiver circuit 102 in unit 101 through communication link 121 using an Ethernet standard.

Figure 2:
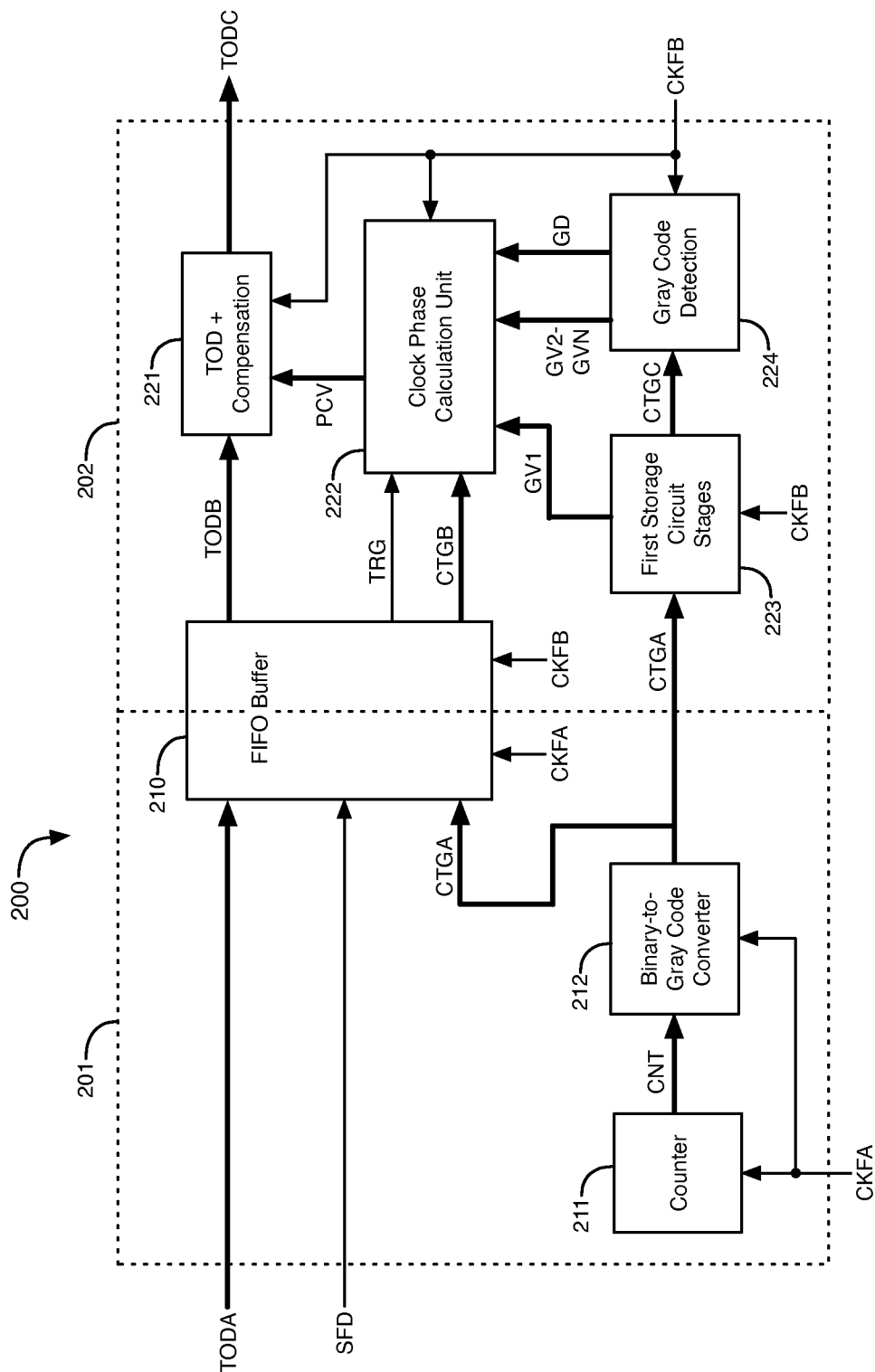
FIG. 2 illustrates an example of a time of day adjustment circuit, according to an embodiment of the present invention.

FIG. 2 illustrates an example of a time of day adjustment circuit 200, according to an embodiment of the present invention. In an embodiment, time of day adjustment circuit 105 shown in FIG. 1 includes a first instance of time of day adjustment circuit 200 as shown in FIG. 2, and time of day adjustment circuit 115 shown in FIG. 1 includes a second instance of time of day adjustment circuit 200 as shown in FIG. 2.

Time of day adjustment circuit 200 converts a time of day from a first clock domain that is clocked by a first clock signal CKFA to a second clock domain that is clocked by a second clock signal CKFB. Clock signals CKFA and CKFB have two different frequencies and are asynchronous. The clock signals CKFA and CKFB that clock the two clock domains may have any arbitrary frequencies.

Time of day adjustment circuit 200 includes first-in-first-out (FIFO) buffer circuit 210, counter circuit 211, binary-to-Gray code converter circuit 212, time of day (TOD) plus (+)

compensation circuit 221, clock phase calculation unit circuit 222, first storage circuit stages 223, and Gray code detection circuit 224.

Time of day adjustment circuit 200 is grouped into two clock domains. Time of day adjustment circuit 200 includes circuitry 201 that is in a first clock domain and circuitry 202 that is in a second clock domain. Circuitry 201 includes counter circuit 211, binary-to-Gray code converter circuit 212, and a first portion of FIFO buffer circuit 210. Circuitry 202 includes time of day (TOD) plus compensation circuit 221, clock phase calculation unit circuit 222, first storage circuit stages 223, Gray code detection circuit 224, and a second portion of FIFO buffer circuit 210.

Circuitry 201 is clocked by clock signal CKFA, and circuitry 202 is clocked by clock signal CKFB. In time of day adjustment circuit 105 in FIG. 1, clock signal CKFA is clock signal CKF1A, and clock signal CKFB is clock signal CKF2B. In time of day adjustment circuit 115 in FIG. 1, clock signal CKFA is clock signal CKF2A, and clock signal CKFB is clock signal CKF1B.

A set of signals TODA that indicate the time of day are provided in parallel to inputs of FIFO buffer circuit 210. Signals TODA are synchronized with clock signal CKFA. Time of day adjustment circuit 200 generates output signals TODC based on input signals TODA. Time of day adjustment circuit 200 converts the time of day as indicated by signals TODA from the clock domain of clock signal CKFA to the clock domain of clock signal CKFB to generate output signals TODC. Output signals TODC indicate the time of day as indicated by signals TODA adjusted by a time offset. Signals TODC are synchronized with clock signal CKFB. In time of day adjustment circuit 105, input signals TODA are input signals TOD1, and output signals TODC are output signals TOD2. In time of day adjustment circuit 115, input signals TODA are input signals TOD4, and output signals TODC are output signals TOD5.

Counter circuit 211 generates binary encoded count signals CNT in response to clock signal CKFA. In an embodiment, counter circuit 211 increases the binary value of the count signals CNT by 1 in response to each rising edge (or each falling edge) in clock signal CKFA. As a specific example, counter circuit 211 may be a 5-bit counter that generates 5 parallel count signals CNT. In this example, counter circuit 211 increases the binary value of the count signals CNT from the minimum count value 00000 to the maximum count value 11111 after 31 rising edges (or 31 falling edges) in clock signal CKFA. In response to the $32^{nd}$ rising edge (or $32^{nd}$ falling edge) in clock signal CKFA, counter circuit 211 resets the binary value of count signals CNT from 11111 to 00000. The counting process then repeats, as counter circuit 211 increases the binary value of count signals CNT by one in response to each subsequent rising edge (or each falling edge) in clock signal CKFA, until the maximum count value is reached again.

Count signals CNT are provided in parallel to inputs of binary-to-Gray code converter circuit 212. Binary-to-Gray code converter circuit 212 converts each binary value of count signals CNT into a Gray coded value as indicated by signals CTGA in response to clock signal CKFA. A Gray code is a numeral system where two successive values differ by only one bit. Binary-to-Gray code converter circuit 212 maps each binary value generated in count signals CNT to a unique Gray coded value in signals CTGA. In response to each increase of 1 in the binary value of count signals CNT, binary-to-Gray code converter circuit 212 increases the Gray coded value of signals CTGA by 1 in response to clock signal CKFA by changing the logic state of only one of signals CTGA. Thus, signals CTGA are Gray coded count signals.

Binary-to-Gray code converter circuit 212 may, for example, include a lookup table. Signals CTGA have the same number of signals as signals CNT. For example, if counter circuit 211 generates 5 signals CNT, then binary-to-Gray code converter circuit 212 generates 5 signals CTGA. Signals CTGA are provided in parallel to inputs of FIFO buffer circuit 210 and to inputs of first storage circuit stages 223.

Control signal SFD is provided to a control input of FIFO buffer circuit 210. Control signal SFD is asserted to indicate when to convert the time of day as indicated by signals TODA from the clock domain of clock signal CKFA to the clock domain of clock signal CKFB to generate signals TODC. In an embodiment, control signal SFD is a start of frame delimiter signal that indicates when an Ethernet data packet in unit 101 is ready for transmission to unit 111. In time of day adjustment circuit 105, control signal SFD in FIG. 2 is control signal SFD1 in FIG. 1. In time of day adjustment circuit 115, control signal SFD in FIG. 2 is control signal SFD2 in FIG. 1.

FIFO buffer circuit 210 is an asynchronous FIFO buffer circuit. In an asynchronous FIFO buffer, values are written to the FIFO buffer from one clock domain, and the values are read from the FIFO buffer from another clock domain, where the two clock domains are asynchronous to each other. In response to control signal SFD being asserted, FIFO buffer circuit 210 stores the logic states of signals TODA indicating the time of day in response to clock signal CKFA. Also, in response to control signal SFD being asserted, FIFO buffer circuit 210 stores the logic states of signals CTGA indicating a Gray coded value in response to clock signal CKFA. Control signal SFD is asserted by changing control signal SFD from one logic state to another logic state.

FIFO buffer circuit 210 causes the time of day to be transmitted safely across clock domains. The latency through FIFO buffer circuit 210 should be equal to or larger than the latency of the first storage circuit stages 223. If the time of day is sent through FIFO buffer circuit 210 in less time than a Gray coded value of signals CTGA propagates through first storage circuit stages 223, clock phase calculation unit 222 may not have the latest information in signals GD from Gray code detection circuit 224.

In alternative embodiments, FIFO buffer circuit 210 is replaced with another type of circuitry that can transfer data securely from one clock domain to another clock domain, such as a register bank that securely transfers data with handshake signals.

FIFO buffer circuit 210 outputs signals TODB that indicate the same time of day indicated by input signals TODA. FIFO buffer circuit 210 also outputs signals CTGB that indicate the same Gray coded value indicated by signals CTGA. FIFO buffer circuit 210 synchronizes signals TODB and CTGB with clock signal CKFB. Signals TODB and CTGB are stored in FIFO buffer circuit 210. FIFO buffer circuit 210 updates the logic states of signals TODB to equal the logic states of signals TODA in response to signal SFD being asserted. FIFO buffer circuit 210 updates the logic states of signals CTGB to equal the logic states of signals CTGA in response to signal SFD being asserted.

Figure 3:
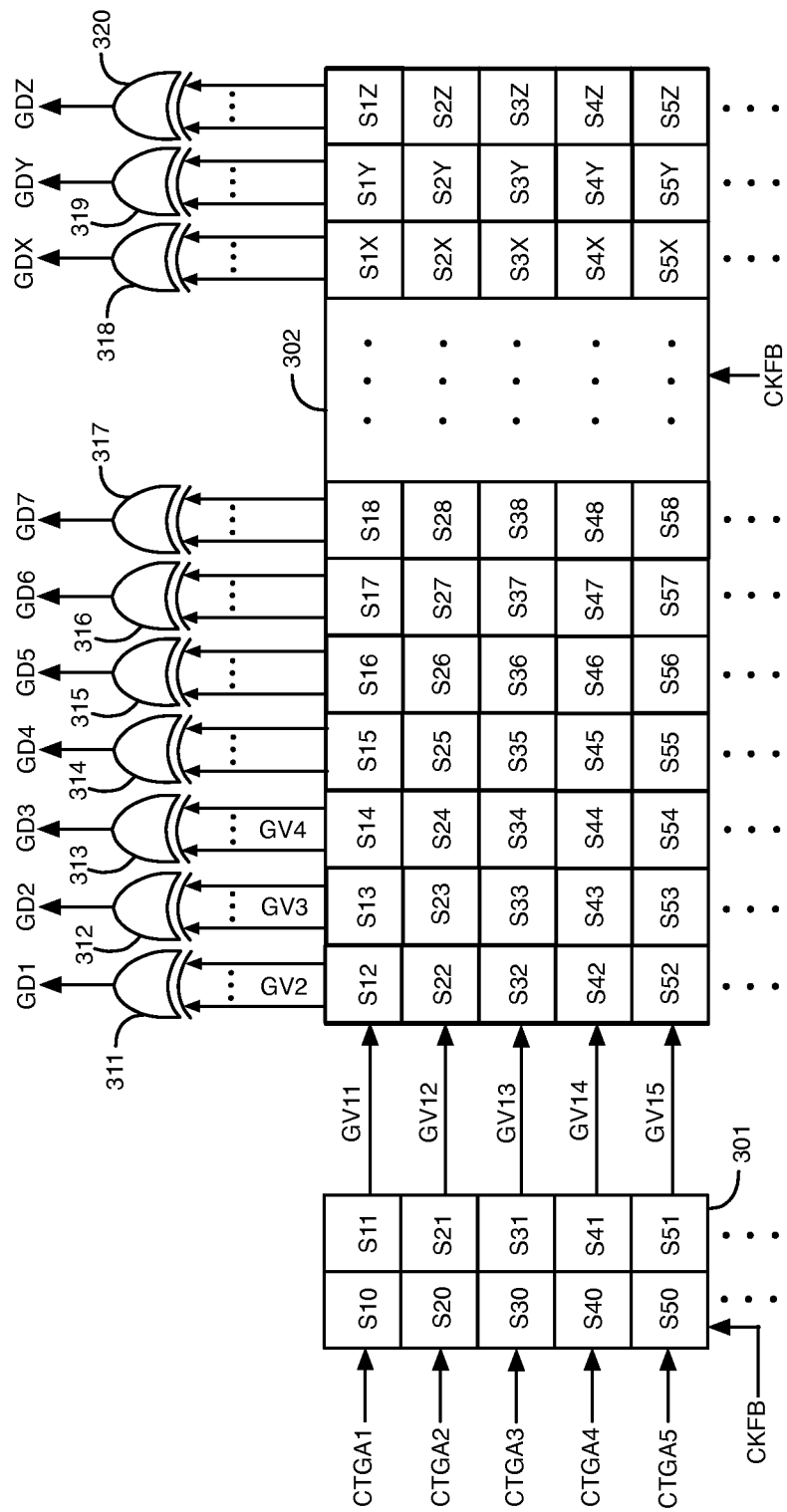
FIG. 3 illustrates embodiments of the first storage circuit stages and the Gray code detection circuit of FIG. 2.

FIG. 3 illustrates embodiments of first storage circuit stages 223 and Gray code detection circuit 224. According to these embodiments, first storage circuit stages 223 includes shift register circuit 301 shown in FIG. 3, and Gray code detection circuit 224 includes shift register circuit 302 and XOR gate circuits 311-320 shown in FIG. 3.

Shift register circuits 301-302 may have any number of serial shift registers operating in parallel with each other. FIG. 3 shows 5 serial shift registers S10-S1Z, S20-S2Z, S30-S3Z, S40-S4Z, and S50-S5Z in shift register circuits 301-302 as an example. Shift register circuit 301 has 2 stages of register circuits including stage S10-S50 and stage S11-S51. Shift register circuit 302 includes stage S12-S52, stage S13-S53, stage S14-S54, stage S15-S55, stage S16-S56, stage S17-S57, stage S18-S58, stage S1X-S5X, stage S1Y-55Y, and stage S1Z-S5Z. Shift register circuit 302 has 30 stages in an embodiment in which counter circuit 211 generates 5 count signals CNT. Only 10 stages are shown in FIG. 3 as an example and to simplify the drawing. Each stage of shift register circuits 301-302 includes at least 5 registers, one register from each of the 5 serial shift registers S10-S1Z, S20-S2Z, S30-S3Z, S40-S4Z, and S50-S5Z.

In FIG. 3, signals CTGA include at least 5 signals referred to as signals CTGA1-CTGA5. Signals CTGA1-CTGA5 are provided to inputs of shift register circuit 301. The Gray coded value indicated by signals CTGA1-CTGA5 is stored in the first stage of register circuits S10-S50 in response to each rising edge (or each falling edge) in clock signal CKFB.

The Gray coded value stored in each stage of shift register 301 is shifted to the right one stage in FIG. 3 in response to each rising edge (or each falling edge) in clock signal CKFB. For example, the Gray coded value stored in the first stage of register circuits S10-S50 is transferred to and stored in the second stage of register circuits S11-S51 as signals GV11-GV15, respectively, in response to each rising edge (or each falling edge) in clock signal CKFB.

The Gray coded value indicated by signals GV11-GV15 is shifted through register stages S12-S52, S13-S53, S14-S54, S15-S55, S16-S56, S17-S57, S18-S58, ... S1X-S5X, S1Y-55Y, and S1Z-S5Z, respectively, in response to clock signal CKFB. The Gray coded value stored in each stage of shift register 302 is shifted to the right one stage in FIG. 3 in response to each rising edge (or each falling edge) in clock signal CKFB. The Gray coded value indicated by signals GV11-GV15 is stored in the third stage of registers S12-S52, respectively, in signals GV2 in response to each rising edge (or each falling edge) in clock signal CKFB. The Gray coded value indicated by signals GV2 is stored in the fourth stage of registers S13-S53 in signals GV3 in response to each rising edge (or each falling edge) in clock signal CKFB. The Gray coded value indicated by signals GV3 is stored in the fifth stage of registers S14-S54 in signals GV4 in response to each rising edge (or each falling edge) in clock signal CKFB. Signals GV11-GV15, GV2, GV3, and GV4 are provided to inputs of clock phase calculation unit circuit 222. Signals GV11-GV15 are referred to as signals GV1 in FIG. 2. Signals GV2, GV3, and GV4 are shown as signals GV2-GVN in FIG. 2.

Shift register circuit 301 stage S11-S51 is a metastability removal register stage. Signals CTGA1-CTGA5 are synchronized in the CKFA clock domain. Shift register circuit 301 stage S11-S51 eliminates any metastability that may be caused by storing signals CTGA1-CTGA5 in registers that are clocked by a clock signal CKFB that is not synchronous with clock signal CKFA.

The Gray coded value stored in registers S12-S52 in signals GV2 is provided to inputs of XOR gate circuit 311. The Gray coded value stored in registers S13-S53 in signals GV3 is provided to inputs of XOR gate circuit 312. The Gray coded value stored in registers S14-S54 in signals GV4 is provided to inputs of XOR gate circuit 313. The Gray coded values stored in registers S15-S55, S16-S56, S17-S57, S18-S58, S1X-S5X, S1Y-55Y, and S1Z-S5Z are provided to inputs of XOR gate circuits 314-320, respectively. The Gray coded values stored in other register stages of shift register 302 not shown in FIG. 3 are provided to inputs of additional XOR gate circuits that are not shown in FIG. 3. XOR gate circuits 311-320 generate output signals GD1, GD2, GD3, GD4, GD5, GD6, GD7, GDX, GDY, and GDZ by performing XOR functions using the Gray coded values stored in registers S12-S52, S13-S53, S14-S54, S15-S55, S16-S56, S17-S57, S18-S58, S1X-S5X, S1Y-55Y, and S1Z-S5Z, respectively. Output signals GD1-GD7, GDX-GDZ, and output signals of other XOR gates in shift register 302 are provided to inputs of clock phase calculation unit circuit 222. Signals GD1-GD7, GDX-GDZ, and output signals of other XOR gates in shift register 302 are collectively referred to as signals GD in FIG. 2.

Figure 4:
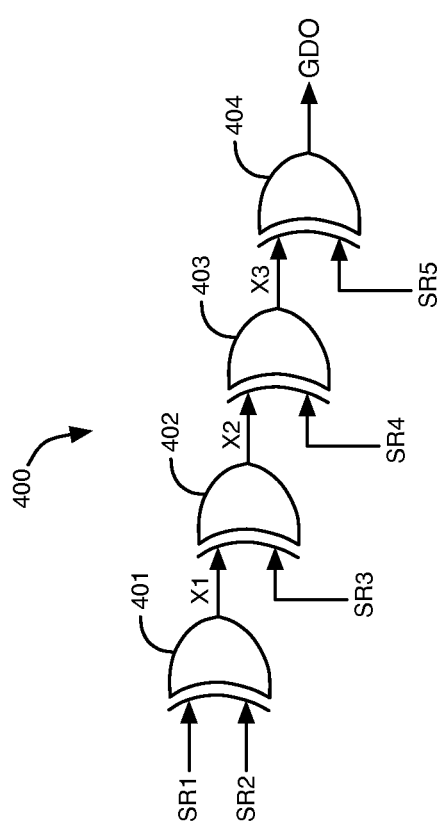
FIG. 4 illustrates an example of the XOR gate circuits shown in FIG. 3.

FIG. 4 illustrates an example of each of XOR gate circuits 311-320. XOR gate circuit 400 includes 4 component XOR gate circuits 401-404. XOR gate circuits 401-404 are cascaded together as shown in FIG. 4. Signals SR1-SR5 represent the Gray coded value stored in a respective one of the register stages of shift register circuit 302. XOR gate circuit 401 performs an XOR function on signals SR1-SR2 to generate signal X1. XOR gate circuit 402 performs an XOR function on signal SR3 and signal X1 to generate signal X2. XOR gate circuit 403 performs an XOR function on signal SR4 and signal X2 to generate signal X3. XOR gate circuit 404 performs an XOR function on signal SR5 and signal X3 to generate output signal GDO.

Two consecutive Gray coded values generated by binary-to-Gray code converter circuit 212 differ by only one bit. However, if clock signal CKFA has a greater frequency than clock signal CKFB, after the rising edge of clock signal CKFA aligns with the rising edge of clock signal CKFB, shift register circuit 301 does not store one of the Gray coded values generated by binary-to-Gray code converter circuit 212. As a result, two Gray coded values stored in adjacent stages of shift register circuit 301 differ by two bits, instead of by one bit. When these two Gray coded values are shifted into shift register circuit 302, two of the XOR gates 311-320 etc. in Gray code detection circuit 224 generate two consecutive output signals among signals GD that have the same logic state in response to these two Gray coded values. The other output signals GD of Gray code detection circuit 224 have alternating logic states (e.g., 101010 . . . ), because the other Gray coded values stored in adjacent stages of shift register circuit 302 differ by only one bit.

Gray code detection circuit 224 generates two consecutive output signals among signals GD that have the same logic state in repeating intervals. The period of the repeating intervals depends on the frequency $F_{CKFA}$ of clock signal CKFA and the frequency $F_{CKFB}$ of clock signal CKFB. Equation (1) below shows the number N of clock periods of clock signal CKFB that occur between each set of two consecutive output signals among signals GD having the same logic state.

$$N = (1/F_{CKFB})/(1/F_{CKFB} - 1/F_{CKFA}) \qquad (1)$$

As an example that is not intended to be limiting, if the frequency of clock signal CKFA is 257.8125 MHz, and the frequency of clock signal CKFB is 245.76 MHz, then N equals about 21.3.

If clock signal CKFB has a greater frequency than clock signal CKFA, shift register circuit 301 stores one of the Gray coded values generated by binary-to-Gray code converter circuit 212 in two adjacent stages of registers. As a result, two adjacent stages of shift register circuit 301 store the same Gray coded value. When this Gray coded value is shifted into two adjacent stages of shift register circuit 302, two of the XOR gates 311-320 etc. in Gray code detection circuit 224 generate two consecutive output signals among signals GD that have the same logic state in response to this Gray coded value. The other output signals GD of Gray code detection circuit 224 have alternating logic states.

FIFO buffer circuit 210 asserts a TRG signal after the SFD signal is asserted. The TRG signal is provided to an input of clock phase calculation unit circuit 222. In response to the TRG signal being asserted, clock phase calculation unit circuit 222 determines if the Gray coded value indicated by signals CTGB equals the Gray coded value indicated by signals GV1, the Gray coded value indicated by signals GV2, the Gray coded value indicated by signals GV3, or the Gray coded value indicated by signals GV4. The location of the signals GV1, GV2, GV3, or GV4 that equal signals CTGB indicates the delay of FIFO buffer circuit 210 to update signals CTGB in response to control signal SFD being asserted. Clock phase calculation unit circuit 222 also determines the shift register location where a signal in signals GD has the same logic state as a previous consecutive signal in signals GD, indicating adjacent stages of shift register circuit 302 that store the same Gray coded value or Gray coded values that differ by 2.

Each Gray coded value indicated by signals CTGA1-CTGA5 is stored at the output of register stage S11-S51 after 2 periods of clock signal CKFB. Each Gray coded value indicated by signals CTGA1-CTGA5 is stored at the output of register stage S14-S54 after 5 periods of clock signal CKFB. Because first storage circuit stages 223 have two register stages in the embodiment of FIG. 3, the latency of FIFO buffer circuit 210 is equal to or greater than 2 periods of clock signal CKFB and less than or equal to 5 periods of clock signal CKFB. With these timing constraints, the Gray coded value of signals CTGB generated by FIFO buffer circuit 210 can be matched with one set of the signals GV1, GV2, GV3, or GV4 stored in register stages S11-S51, S12-S52, S13-S53, or S14-S54, respectively.

In an embodiment, signals GV1, GV2, GV3, and GV4 represent shift register locations of 2, 3, 4, and 5, respectively. In this embodiment, signals GD1-GD7 and GDX-GDZ (i.e., signals GD) represent shift register locations of 3, 4, 5, 6, 7, 8, 9, . . . , 30, 31, and 32, respectively. Clock phase calculation unit circuit 222 subtracts the shift register location of the register stage storing the signals GV1, GV2, GV3, or GV4 that equal signals CTGB from the shift register location of a signal in signals GD that has the same logic state as a previous consecutive signal in signals GD to generate a time offset value. For example, if the Gray coded value indicated by signals GV2 equals the Gray coded value indicated by signals CTGB, and 30 signals GD1-GDZ (i.e., 30 signals GD) have logic states of 101010101010101101010101010101, respectively, clock phase calculation unit circuit 222 subtracts 3 from 18 to generate a time offset value of 15.

The time offset value indicates the phase difference between clock signals CKFA and CKFB. Clock phase calculation unit circuit 222 generates signals PCV that indicate the time offset value. Signals PCV are provided in parallel to inputs of time of day plus compensation circuit 221. Clock phase calculation unit circuit 222 is clocked by clock signal CKFB.

Time of day plus compensation circuit 221 generates output signals TODC indicating an adjusted time of day based on the time of day indicated by signals TODB and based on the time offset value indicated by signals PCV. In one embodiment, time of day plus compensation circuit 221 generates a first subset of signals TODC indicating the same time of day indicated by signals TODB and a second subset of signals TODC indicating the time offset value indicated by signals PCV.

In another embodiment, time of day plus compensation circuit 221 divides the time offset value indicated by signals PCV by the number N calculated from equation (1) to generate a fractional phase compensation value. For example, if N equals 21.3, and the time offset value is calculated to be 16, then time of day plus compensation circuit 221 divides 16 by 21.3 to generate a fractional phase compensation value of 0.7512. Time of day plus compensation circuit 221 then multiplies the fractional phase compensation value by the period of clock signal CKFB to generate a fractional period compensation value. In this embodiment, time of day plus compensation circuit 221 includes an adder circuit that adds the fractional period compensation value to the time of day indicated by signals TODB to generate an adjusted time of day in signals TODC.

In an alternative embodiment, clock phase calculation unit 222 calculates multiple time offset values and averages the multiple time offset values together to generate an average time offset value. Clock phase calculation unit 222 may periodically calculate a new time offset value in response to a clock signal, instead of in response to signal TRG. Each time offset value may be calculated after a repeating interval to generate multiple time offset values. After a predetermined number of time offset values have been calculated, clock phase calculation unit 222 generates the average time offset value. In this embodiment, clock phase calculation unit 222 causes signals PCV to indicate the average time offset value. Calculating an average time offset value may provide more accuracy than calculating only one time offset value.

Gray code detection circuit 224 may not generate two consecutive signals having the same logic state if clock signals CKFA and CKFB are aligned when signal SFD is asserted. In an embodiment, clock phase calculation unit 222 continues to monitor signals GD until two consecutive signals GD having the same logic state are detected and a time offset value is calculated (e.g., after signal SFD is asserted again).

Figure 5:
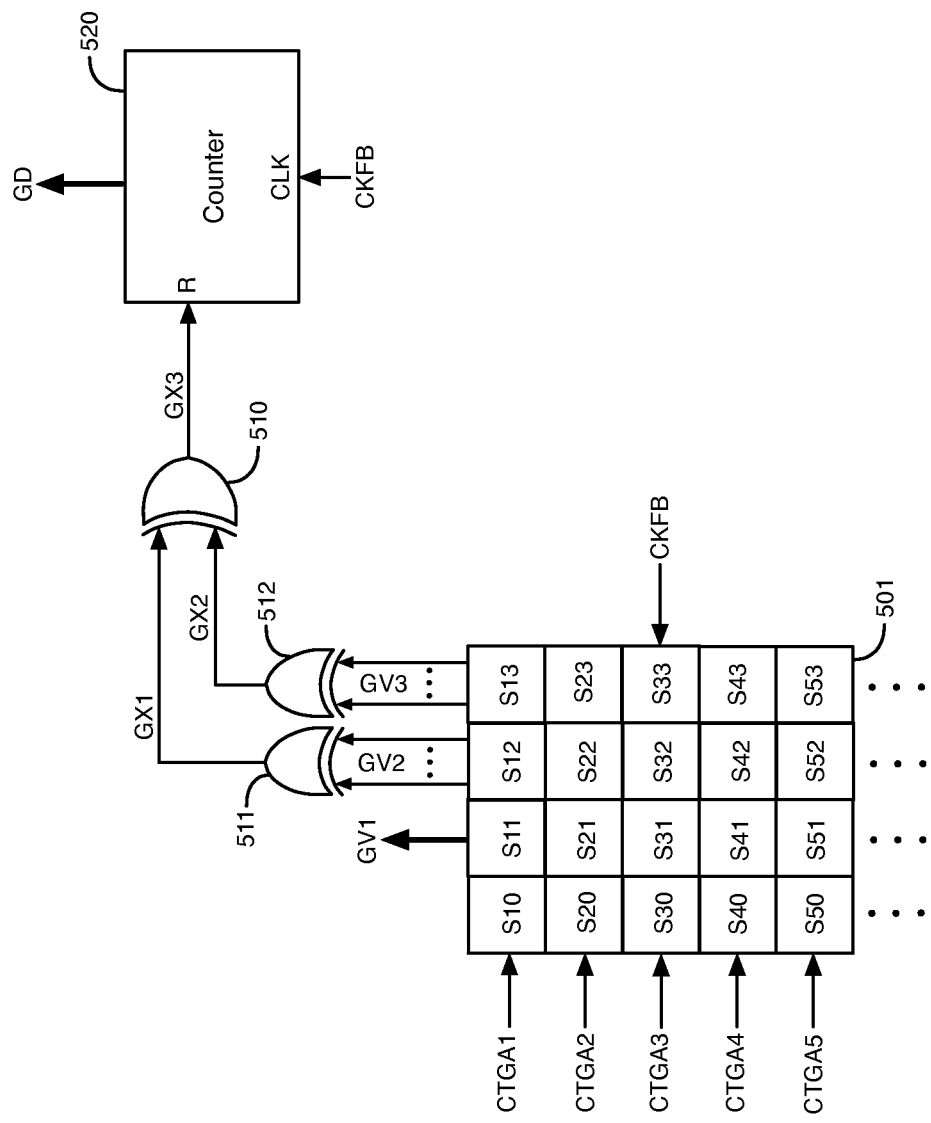
FIG. 5 illustrates alternative embodiments of the first storage circuit stages and the Gray code detection circuit of FIG. 2.

FIG. 5 illustrates alternative embodiments of first storage circuit stages 223 and Gray code detection circuit 224. According to these embodiments, first storage circuit stages 223 include stages S10-S50 and S11-S51 in shift register circuit 501 shown in FIG. 5. Gray code detection circuit 224 includes stages S12-S52 and S13-S53 in shift register circuit 501, counter circuit 520, and XOR gate circuits 510-512 shown in FIG. 5.

Shift register circuit 501 may have any number of serial shift registers operating in parallel with each other. FIG. 5 shows 5 serial shift registers S10-S13, S20-S23, S30-S33, S40-S43, and S50-S53 in shift register circuit 501 as an example. Shift register circuit 501 has 4 register stages including stage S10-S50, stage S11-S51, stage S12-S52, and stage S13-S53.

In FIG. 5, signals CTGA include at least 5 signals referred to as signals CTGA1-CTGA5. Signals CTGA1-CTGA5 are provided to inputs of shift register circuit 501. The Gray coded value indicated by signals CTGA1-CTGA5 is stored in the first stage of register circuits S10-S50, respectively, in response to each rising edge (or each falling edge) in clock signal CKFB.

The Gray coded value stored in each stage of shift register 501 is shifted to the right one stage in FIG. 5 in response to each rising edge (or each falling edge) in clock signal CKFB. For example, the Gray coded value stored in the first stage of register circuits S10-S50 is transferred to and stored in the second stage of register circuits S11-S51 in signals GV1 in response to each rising edge (or each falling edge) in clock signal CKFB. The Gray coded value indicated by signals GV1 is stored in the third stage of registers S12-S52 in signals GV2 in response to each rising edge (or each falling edge) in clock signal CKFB. The Gray coded value indicated by signals GV2 is stored in the fourth stage of registers S13-S53 in signals GV3 in response to each rising edge (or each falling edge) in clock signal CKFB. Signals GV1, GV2, and GV3 are provided to inputs of clock phase calculation unit circuit 222, as shown in FIG. 2. Signals GV2 and GV3 are referred to as signals GV2-GVN in FIG. 2.

The 5 registers in register stage S11-S51 of shift register 501 are metastability removal registers. Signals CTGA1-CTGA5 are synchronized in the CKFA clock domain. Register stage S11-S51 eliminates any metastability that may be caused by storing signals CTGA1-CTGA5 in registers that are clocked by a clock signal CKFB that is not synchronized with clock signal CKFA.

Signals GV2 are provided to inputs of XOR gate circuit 511, and signals GV3 are provided to inputs of XOR gate circuit 512. XOR gate circuit 511 generates an output signal GX1 by performing an XOR function using signals GV2. XOR gate circuit 512 generates an output signal GX2 by performing an XOR function using signals GV3. XOR gate circuit 400 shown in FIG. 4 is an example of each of XOR gate circuits 511 and 512. Signals GX1 and GX2 are provided to inputs of XOR gate circuit 510. XOR gate circuit 510 performs an XOR function on signals GX1 and GX2 to generate signal GX3. Signal GX3 is provided to the reset input R of counter circuit 520. Clock signal CKFB is provided to the CLK input of counter circuit 520.

XOR gate circuit 510 causes signal GX3 to have a logic high state in response to signals GX1 and GX2 having different logic states. XOR gate circuit 510 causes signal GX3 to have a logic low state in response to signals GX1 and GX2 having the same logic state. Signals GX1 and GX2 have the same logic state in response to register stages S12-S52 and S13-S53 storing the same Gray coded value or two Gray coded values that differ by 2 bits.

In the embodiment of FIG. 5, counter circuit 520 generates binary encoded count signals GD. In response to each falling edge that XOR gate circuit 510 generates in signal GX3, counter circuit 520 resets the binary value of signals GD to 4. Counter circuit 520 then increases the binary value of count signals GD by 1 in response to each rising edge (or each falling edge) in clock signal CKFB. Counter circuit 520 increases the binary value of signals GD from 4 to larger integer numbers, until counter circuit 520 receives a falling edge in signal GX3 and resets the binary value of signals GD to 4 again.

In the embodiment of FIG. 5, signals GV1, GV2, and GV3 represent shift register locations of 2, 3, and 4, respectively. Count signals GD are provided from counter circuit 520 to inputs of clock phase calculation unit circuit 222. In response to signal TRG being asserted, clock phase calculation unit circuit 222 subtracts the shift register location of the signals GV1, GV2, or GV3 that equal signals CTGB from the binary value of count signals GD to generate a time offset value. For example, if the Gray coded value indicated by signals GV1 equals the Gray coded value indicated by signals CTGB, and count signals GD have a binary value of 15, clock phase calculation unit circuit 222 subtracts 2 from 15 to generate a time offset value of 13. Clock phase calculation unit circuit 222 generates signals PCV indicating the time offset value. Time of day plus compensation circuit 221 generates signals TODC indicating an adjusted time of day based on signals PCV and TODB, as described above.

Figure 6:
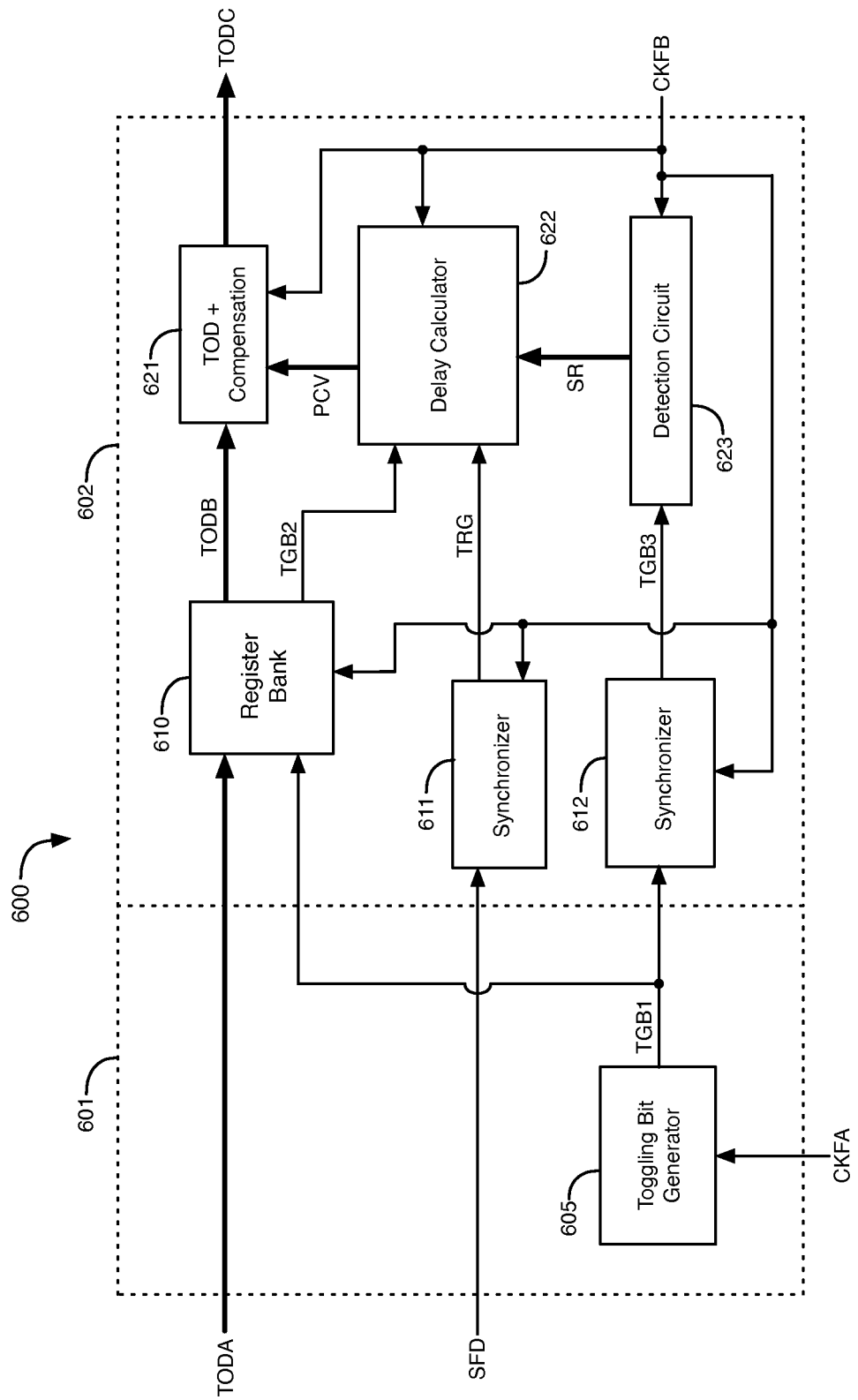
FIG. 6 illustrates another example of a time of day adjustment circuit, according to an alternative embodiment of the present invention.

FIG. 6 illustrates another example of a time of day adjustment circuit 600, according to an embodiment of the present invention. In an alternative embodiment, time of day adjustment circuit 105 shown in FIG. 1 includes a first instance of time of day adjustment circuit 600 as shown in FIG. 6, and time of day adjustment circuit 115 shown in FIG. 1 includes a second instance of time of day adjustment circuit 600 as shown in FIG. 6.

Time of day adjustment circuit 600 converts a time of day from a first clock domain that is clocked by a first clock signal CKFA to a second clock domain that is clocked by a second clock signal CKFB. Clock signals CKFA and CKFB have two different frequencies and are asynchronous. The frequencies of the clock signals CKFA and CKFB that clock the two clock domains may have any arbitrary frequency values.

Time of day adjustment circuit 600 is grouped into two clock domains. Time of day adjustment circuit 600 includes circuitry 601 that is in a first clock domain and circuitry 602 that is in a second clock domain. Circuitry 601 includes toggling bit generator circuit 605. Circuitry 602 includes register bank circuit 610, synchronizer circuit 611, synchronizer circuit 612, time of day plus (TOD+) compensation circuit 621, delay calculator circuit 622, and detection circuit 623.

Circuitry 601 is clocked by clock signal CKFA, and circuitry 602 is clocked by clock signal CKFB. In time of day adjustment circuit 105 in FIG. 1, clock signal CKFA is clock signal CKF1A, and clock signal CKFB is clock signal CKF2B. In time of day adjustment circuit 115 in FIG. 1, clock signal CKFA is clock signal CKF2A, and clock signal CKFB is clock signal CKF1B.

A set of signals TODA that indicate a time of day are provided in parallel to inputs of register bank circuit 610. Signals TODA are synchronized with clock signal CKFA. Time of day adjustment circuit 600 generates output signals TODC based on input signals TODA. Time of day adjustment circuit 600 converts the time of day as indicated by signals TODA from the clock domain of clock signal CKFA to the clock domain of clock signal CKFB to generate output signals TODC. Output signals TODC indicate the time of day as indicated by signals TODA adjusted by a time offset. Signals TODC are synchronized with clock signal CKFB. In time of day adjustment circuit 105, input signals TODA are input signals TOD1, and output signals TODC are output signals TOD2. In time of day adjustment circuit 115, input signals TODA are input signals TOD4, and output signals TODC are output signals TOD5.

Toggling bit generator circuit 605 generates a digital signal TGB1 that toggles between a logic low state and a logic high state (i.e., between 0 and 1) in consecutive periods of clock signal CKFA. Toggling bit generator circuit 605 causes signal TGB1 to change state in response to each rising edge (or each falling edge) in clock signal CKFA. For example, toggling bit generator circuit 605 may cause signal TGB1 to be in a logic high state in the even numbered periods of clock signal CKFA and in a logic low state in the odd numbered periods of clock signal CKFA. Signal TGB1 is provided to an input of register bank circuit 610 and to an input of synchronizer circuit 612.

Control signal SFD is provided to an input of synchronizer circuit 611. Control signal SFD is asserted to indicate when to convert the time of day as indicated by signals TODA from the clock domain of clock signal CKFA to the clock domain of clock signal CKFB to generate signals TODC. In time of day adjustment circuit 105, control signal SFD in FIG. 6 is control signal SFD1 in FIG. 1. In time of day adjustment circuit 115, control signal SFD in FIG. 6 is control signal SFD2 in FIG. 1.

Register bank circuit 610 stores the logic states of signals TODA in response to each rising edge (or each falling edge) of clock signal CKFB to generate stored signals TODB. Stored signals TODB indicate the same time of day as signals TODA. Signals TODB are provided to inputs of time of day plus compensation circuit 621. Register bank circuit 610 stores the logic state of signal TGB1 in response to each rising edge (or each falling edge) of clock signal CKFB to generate stored signal TGB2. Signal TGB2 has the stored logic state of signal TGB1. In an embodiment, register bank circuit 610 has the same number of flip-flops as there are signals TODA for storing signals TODA to generate stored signals TODB and only one flip-flop for storing signal TGB1 to generate stored signal TGB2. Each flip-flop stores only one of the signals TODB or TGB2.

Synchronizer circuit 611 stores the logic state of control signal SFD in response to each rising edge (or each falling edge) of clock signal CKFB to generate a control signal TRG. Control signal TRG is synchronized with clock signal CKFB.

Synchronizer circuit 612 stores the logic state of signal TGB1 in response to each rising edge (or each falling edge) of clock signal CKFB to generate signal TGB3. Signal TGB3 is synchronized with clock signal CKFB. Signal TGB3 has the stored logic state of signal TGB1. Signal TGB3 indicates toggling bits that are delayed relative to the toggling bits of signal TGB1. Because synchronizer circuit 612 generates one signal TGB3, synchronizer circuit 612 does not generate skew between multiple parallel signals indicating a Gray coded value, as may occur in an implementation of FIG. 2.

In an embodiment, each of the synchronizer circuits 611 and 612 includes one or more flip-flops that store the values of signals SFD and TGB1, respectively. In one exemplary embodiment of FIG. 6, synchronizer circuit 611 has one more flip-flop than synchronizer circuit 612. For example, synchronizer circuit 611 has 3 flip-flops that are coupled in series, and synchronizer circuit 612 has 2 flip-flops that are coupled in series.

According to an embodiment of FIG. 6 that is now described, detection circuit 623 is a serial shift register circuit that is clocked by clock signal CKFB. The shift register circuit in detection circuit 623 has several flip-flop circuits that are coupled together in serial. Detection circuit 623 stores the logic state of signal TGB3 in a first flip-flop circuit in response to each rising edge (or each falling edge) in clock signal CKFB. The logic state of the signal stored in each flip-flop in the shift register in detection circuit 623 is shifted to the next flip-flop in response to each rising edge (or each falling edge) in clock signal CKFB. For example, the logic state of the signal stored in the first flip-flop circuit is serially shifted to the second flip-flop circuit in detection circuit 623 in response to each rising edge (or each falling edge) in clock signal CKFB. Signals SR are the signals stored at the Q outputs of the flip-flop circuits in the shift register in detection circuit 623.

If clock signal CKFA has a greater frequency than clock signal CKFB, the shift register in detection circuit 623 does not store one of the values generated in signal TGB1, causing two consecutive signals among signals SR to have the same logic state. Because signals TGB1 and TGB3 toggle between logic high and low states, the other output signals SR of detection circuit 623 have alternating logic states (e.g., 101010 . . . ).

If clock signal CKFB has a greater frequency than clock signal CKFA, the shift register in detection circuit 623 stores one of the values generated in signal TGB1 in two adjacent flip-flop circuits, causing two consecutive signals among signals SR to have the same logic state. The other output signals SR of detection circuit 623 have alternating logic states in this embodiment.

In equations (2) and (3) below, D1 is the delay of signal SFD from the output of the circuit that generates signal SFD to the input of synchronizer circuit 611, D2 is the delay of signal TGB1 from the output of toggling bit generator circuit 605 to the input of synchronizer circuit 612, $T_{SU}$ is the set-up time of flip-flops in synchronizer circuits 611-612, $T_{HD}$ is the hold time of flip-flops in synchronizer circuits 611-612, $T_{CLK1}$ is the period of clock signal CKFA, and $T_{CLK2}$ is the period of clock signal CKFB.

$$D2 < D1 - (T_{SU} + T_{HD}) \qquad (2)$$

$$D1 - D2 < T_{CLK1} - (T_{CLK2} - T_{CLK1}) - (T_{SU} + T_{HD}) \qquad (3)$$

Signals TGB2, TRG, and SR are provided to delay calculator circuit 622. In response to the TRG signal being asserted, delay calculator circuit 622 determines if signal TGB2 has the same logic state as the signal stored in the first flip-flop in the shift register in detection circuit 623 or the signal stored in the second flip-flop in the shift register in detection circuit 623. If the constraints of equations (2) and (3) are satisfied, delay calculator circuit 622 only compares signal TGB2 to the signals stored in the first and second flip-flop circuits in the shift register in detection circuit 623. In an embodiment, the first two signals SR are the signals stored in the first and second flip-flop circuits in the shift register in detection circuit 623.

Delay calculator circuit 622 also determines the shift register locations where 2 consecutive signals among signals SR have the same logic state. If signal TGB2 has the same logic state as the signal stored in the first flip-flop in the shift register in detection circuit 623, clock phase calculation unit circuit 622 subtracts 1 from the shift register location where a signal in signals SR has the same logic state as a previous consecutive signal in signals SR to generate a time offset value. If signal TGB2 has the same logic state as the signal stored in the second flip-flop in the shift register in detection circuit 623, clock phase calculation unit circuit 622 subtracts 2 from the shift register location where a signal in signals SR has the same logic state as a previous consecutive signal in signals SR to generate a time offset value.

For example, if signal TGB2 has the same logic state as the signal stored in the second flip-flop in the shift register in detection circuit 623 (i.e., 0), and 25 signals SR have logic states of 1010101010101011010101010, clock phase calculation unit circuit 222 subtracts 2 from 16 to generate a time offset value of 14.

The time offset value indicates the phase difference between clock signals CKFA and CKFB. Clock phase calculation unit circuit 622 generates signals PCV that indicate the time offset value. Signals PCV are provided in parallel to inputs of time of day plus compensation circuit 621. Time of day plus compensation circuit 621 generates output signals TODC indicating an adjusted time of day based on the time of day indicated by signals TODB and based on the time offset value indicated by signals PCV. Time of day plus compensation circuit 621 may, for example, function as described above with respect to time of day plus compensation circuit 221. Clock phase calculation unit circuit 622 and time of day plus compensation circuit 621 are clocked by clock signal CKFB.

In some embodiments of FIG. 6, the shift register in detection circuit 623 does not store alternating logic states. For example, if the frequency of clock signal CKFA is 122.88 MHz and the frequency of clock signal CKFB is 257.8125

MHz, the shift register in detection circuit 623 stores a pattern of 1100110011011 . . . , except for when clock signals CKFA and CKFB are aligned. For these embodiments, delay calculator circuit 622 subtracts the shift register location of the bit in signals SR indicating when clock signals CKFA and CKFB were aligned from 1 or 2 (depending on whether signal TGB2 matches the first or second of the signals SR) to generate the time offset value.

Figure 7:
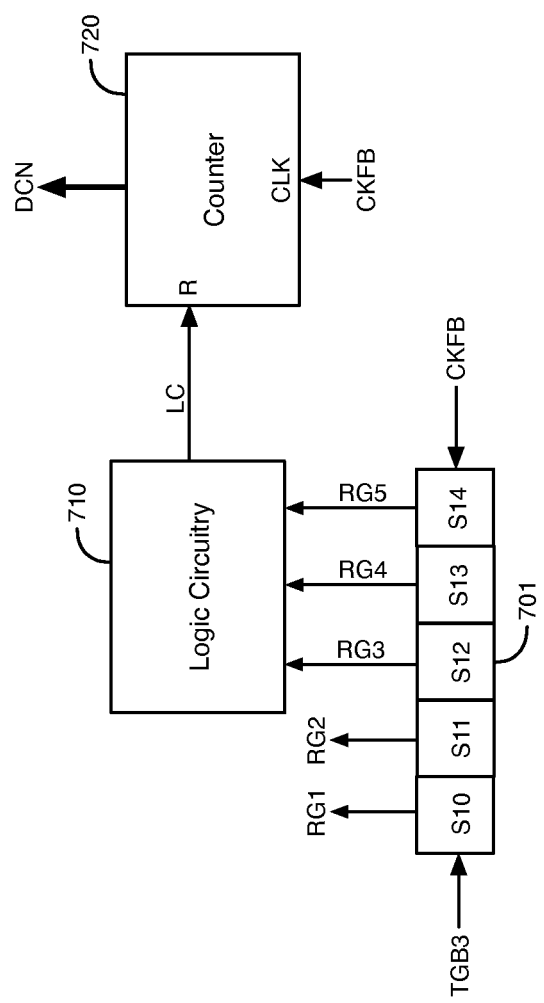
FIG. 7 illustrates an alternative embodiment of the detection circuit shown in FIG. 6.

FIG. 7 illustrates an alternative embodiment of the detection circuit 623 shown in FIG. 6. In the embodiment of FIG. 7, detection circuit 623 includes shift register circuit 701, logic circuitry 710, and counter circuit 720. Shift register circuit 701 is a serial shift register having 5 serially-coupled registers S10-S14 (i.e., flip-flops). Signal TGB3 is provided to an input of register S10. The logic state of signal TGB3 is shifted to the right one register in shift register circuit 701 in response to each rising edge (or each falling edge) of clock signal CKFB.

Registers S10-S14 store signals RG1-RG5, respectively, that indicate the logic states of signal TGB3 in 5 consecutive periods of clock signal CKFB. Signals RG3-RG5 are provided to inputs of logic circuitry 710. Logic circuitry 710 asserts signal LC in response to detecting a pattern of logic states in signals RG3-RG5 that indicate clock signals CKFA and CKFB were aligned. Counter circuit 720 generates binary encoded count signals DCN. Counter circuit 720 resets the binary value of count signals DCN to 5 in response to signal LC being asserted (e.g., receiving a rising edge in signal LC).

Counter circuit 720 increases the binary value of count signals DCN by 1 in response to each rising edge of clock signal CKFB. Signals RG1-RG2 and signals DCN are provided to inputs of delay calculator circuit 622. In response to signal TRG being asserted, delay calculator circuit 622 subtracts 1 or 2 (depending on whether signal TGB2 matches signal RG1 or RG2, respectively) from the binary value of count signals DCN to generate the time offset value. Signals PCV indicate the time offset value.

Figure 8:
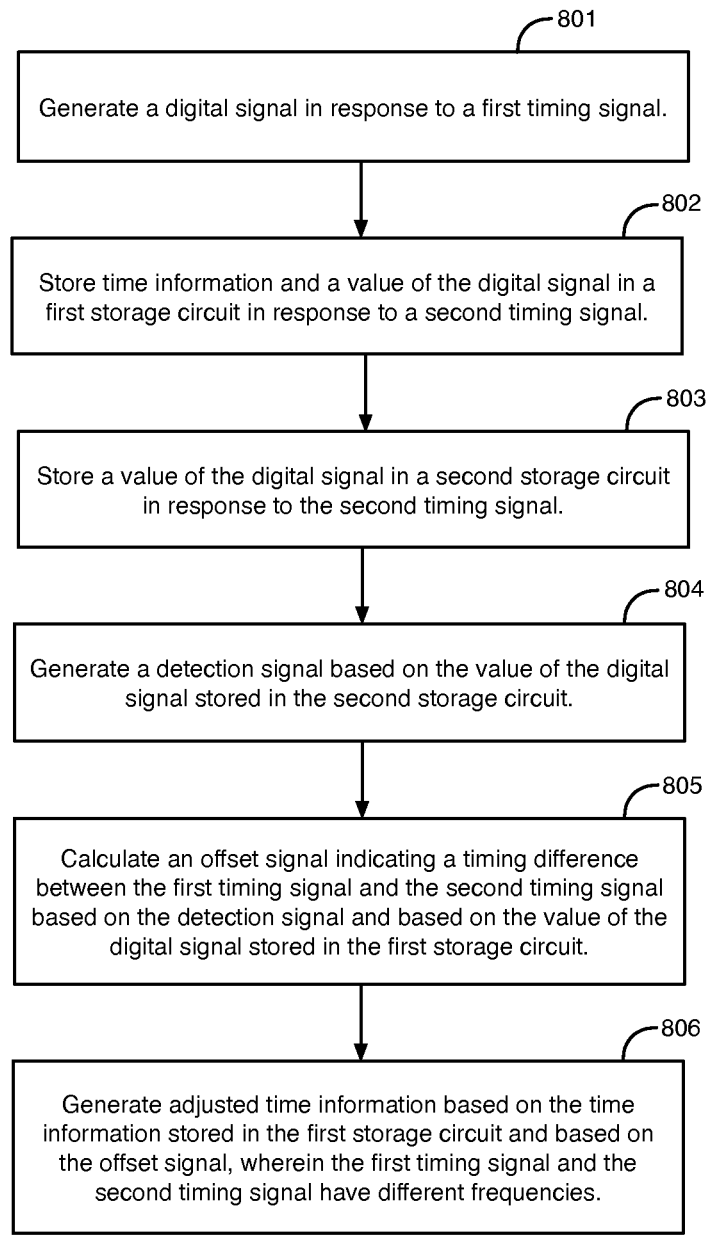
FIG. 8 is a flow chart illustrating an exemplary process for generating adjusted time information, according to an embodiment of the present invention.

FIG. 8 is a flow chart illustrating an example of a process for generating adjusted time information, according to an embodiment of the present invention. In operation 801, a digital signal is generated in response to a first timing signal. The digital signal may be, for example, one of signals CTGA or signal TGB1. The first timing signal is clock signal CKFA. In operation 802, time information and a value of the digital signal are stored in a first storage circuit in response to a second timing signal. The second timing signal is clock signal CKFB, and the time information is indicated by signals TODA. The first storage circuit may be, for example, FIFO buffer circuit 210 or register bank circuit 610. In some embodiments, the circuitry in the first storage circuit (e.g., first flip-flops) that stores the time information is separate from the circuitry in the first storage circuit (e.g., one or more second flip-flops) that stores the value of the digital signal. In operation 803, a value of the digital signal is stored in a second storage circuit in response to the second timing signal. The second storage circuit may be, for example, first storage circuit stages 223 or synchronizer circuit 612.

In operation 804, a detection signal is generated based on the value of the digital signal stored in the second storage circuit. The detection signal may be, for example, one of signals GD in FIG. 2, one of signals SR in FIG. 6, or one of count signals DCN in FIG. 7. In operation 805, an offset signal is calculated that indicates a timing difference between the first timing signal and the second timing signal based on the detection signal and based on the value of the digital signal stored in the first storage circuit. The offset signal may be, for example, one of signals PCV. In operation 806, adjusted time information is generated based on the time information stored in the first storage circuit and based on the offset signal. Signals TODC indicate the adjusted time information in FIGS. 2 and 6. The first timing signal and the second timing signal have different frequencies.

Figure 9:
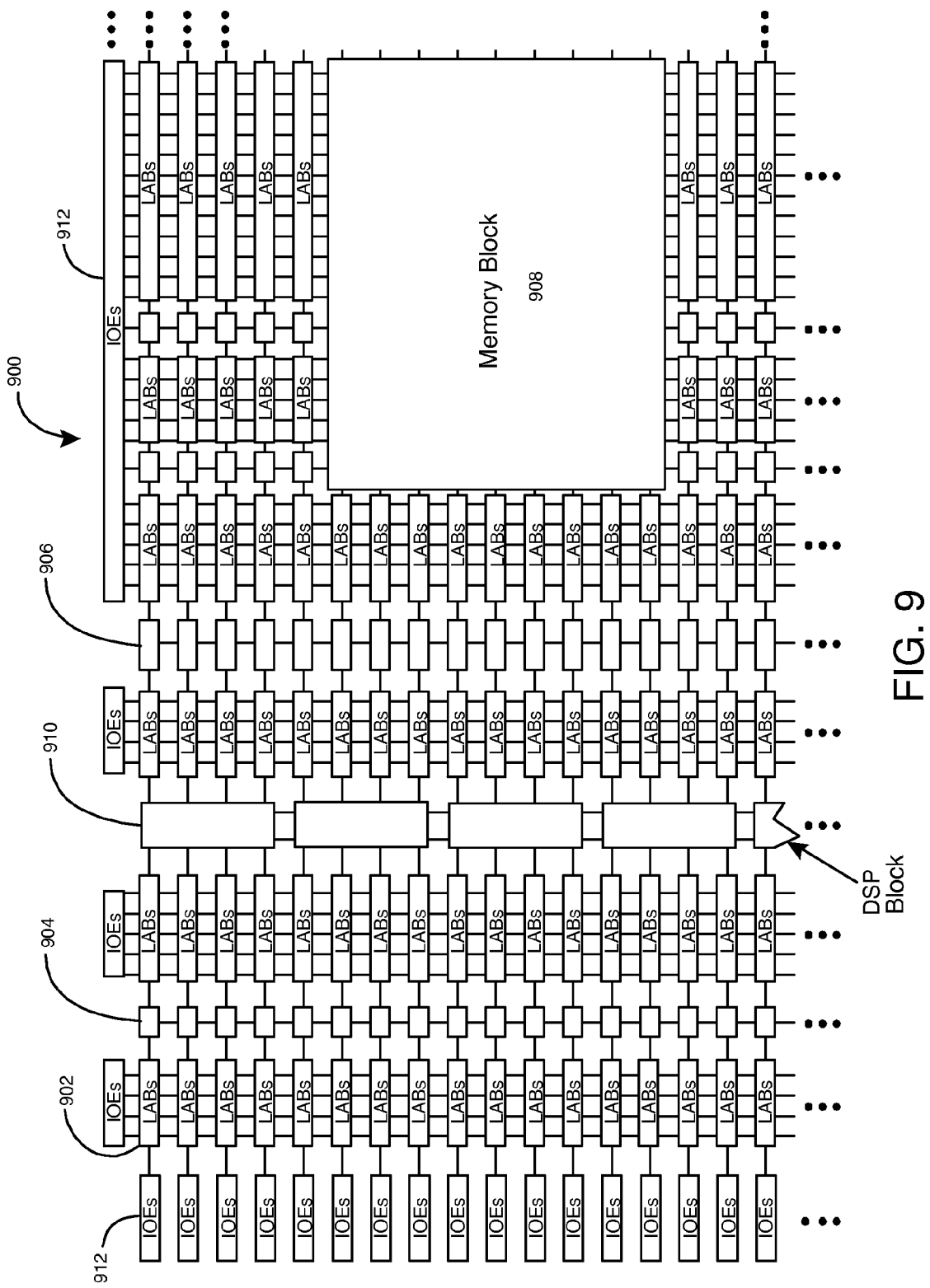
FIG. 9 is a simplified partial block diagram of a field programmable gate array (FPGA) that can include aspects of the present invention.

FIG. 9 is a simplified partial block diagram of a field programmable gate array (FPGA) 900 that can include aspects of the present invention. FPGA 900 is merely one example of an integrated circuit that can include features of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), application specific integrated circuits (ASICs), memory integrated circuits, central processing units, microprocessors, analog integrated circuits, etc.

FPGA 900 includes a two-dimensional array of programmable logic array blocks (or LABs) 902 that are interconnected by a network of column and row interconnect conductors of varying length and speed. LABs 902 include multiple (e.g., 10) logic elements (or LEs).

A logic element (LE) is a programmable logic circuit block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 900 also includes a distributed memory structure including random access memory (RAM) blocks of varying sizes provided throughout the array. The RAM blocks include, for example, blocks 904, blocks 906, and block 908. These memory blocks can also include shift registers and first-in-first-out (FIFO) buffers.

FPGA 900 further includes digital signal processing (DSP) blocks 910 that can implement, for example, multipliers with add or subtract features. Input/output elements (IOEs) 912 support numerous single-ended and differential input/output standards. IOEs 912 include input and output buffers that are coupled to pins of the integrated circuit. The pins are external terminals of the FPGA die that can be used to route, for example, input signals, output signals, and supply voltages between the FPGA and one or more external devices. FPGA 900 is described herein for illustrative purposes. Embodiments of the present invention can be implemented in many different types of integrated circuits.

Figure 10:
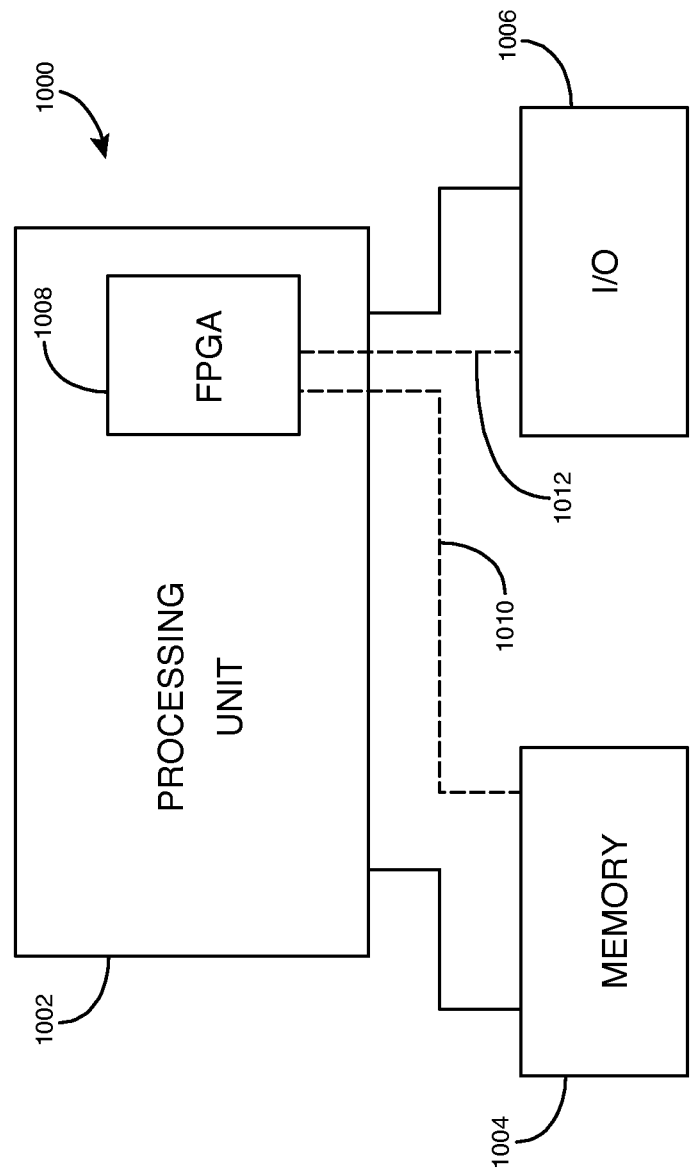
FIG. 10 shows a block diagram of an exemplary digital system that can embody techniques of the present invention.

The present invention can also be implemented in a system that has an FPGA as one of several components. FIG. 10 shows a block diagram of an exemplary digital system 1000 that can embody techniques of the present invention. System 1000 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 1000 can be provided on a single board, on multiple boards, or within multiple enclosures.

System 1000 includes a processing unit 1002, a memory unit 1004, and an input/output (I/O) unit 1006 interconnected together by one or more buses. According to this exemplary embodiment, an FPGA 1008 is embedded in processing unit 1002. FPGA 1008 can serve many different purposes within the system of FIG. 10. FPGA 1008 can, for example, be a logical building block of processing unit 1002, supporting its internal and external operations. FPGA 1008 is programmed to implement the logical functions necessary to carry on its particular role in system operation. FPGA 1008 can be specially coupled to memory 1004 through connection 1010 and to I/O unit 1006 through connection 1012.

Processing unit 1002 can direct data to an appropriate system component for processing or storage, execute a program stored in memory 1004, receive and transmit data via I/O unit 1006, or other similar functions. Processing unit 1002 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 1008 can control the logical operations of the system. As another example, FPGA 1008 acts as a reconfigurable processor that can be reprogrammed as needed to handle a particular computing task. Alternatively, FPGA 1008 can itself include an embedded microprocessor. Memory unit 1004 can be a random access memory (RAM), read only memory (ROM), fixed or flexible disk media, flash memory, tape, or any other storage means, or any combination of these storage means.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A circuit comprising:
a logic circuit to generate a digital value in response to a first periodic signal;
a first storage circuit to store time information in response to a second periodic signal;
a second storage circuit to store the digital value in response to the second periodic signal;
a timing detection circuit comprising a first shift register, the timing detection circuit to generate a detection signal indicating a timing difference between the first periodic signal and the second periodic signal based on the digital value stored in the second storage circuit and based on values stored in the first shift register; and
a compensation circuit to generate adjusted time information based on the time information stored in the first storage circuit and the detection signal.

2. The circuit of claim 1, wherein the logic circuit comprises:
a first counter circuit to generate first count signals having a binary value in response to the first periodic signal; and
a binary-to-Gray code converter circuit to convert the binary value of the first count signals to second count signals having a Gray coded value in response to the first periodic signal, wherein the second storage circuit stores the Gray coded value of the second count signals in response to the second periodic signal.

3. The circuit of claim 1, wherein the second storage circuit is a second shift register, and wherein the second shift register is coupled to the first shift register.

4. The circuit of claim 3, wherein the timing detection circuit comprises XOR gate circuits, wherein each of the XOR gate circuits generates an XOR signal based on a subset of the values stored in the first shift register, and wherein the timing detection circuit generates the detection signal based on two of the XOR signals having the same logic state.

5. The circuit of claim 1, wherein the timing detection circuit comprises a counter circuit to generate count signals in response to the second periodic signal, and wherein the timing detection circuit generates the detection signal based on the count signals.

6. The circuit of claim 1, wherein the logic circuit comprises:
a toggling bit generator circuit to toggle a digital signal in response to the first periodic signal, wherein the second storage circuit stores the digital value of the digital signal in response to the second periodic signal.

7. The circuit of claim 1, wherein the timing detection circuit further comprises a calculation circuit to generate the detection signal based on two signals stored in adjacent flip-flops in the first shift register having a same value.

8. The circuit of claim 1, wherein the adjusted time information is provided to a transmitter for transmission via a communications link.

9. A circuit comprising:
a logic circuit to generate a digital value in response to a first periodic signal;
a first storage circuit to store time information in response to a second periodic signal, wherein the first storage circuit stores the digital value;
a second storage circuit to store the digital value in response to the second periodic signal;
a timing detection circuit to generate a detection signal indicating a timing difference between the first periodic signal and the second periodic signal based on the digital value stored in the first storage circuit and the digital value stored in the second storage circuit; and
a compensation circuit to generate adjusted time information based on the time information stored in the first storage circuit and the detection signal.

10. A circuit comprising:
a logic circuit to generate a digital value in response to a first periodic signal;
an asynchronous first-in-first-out buffer circuit to store time information and the digital value in response to the first periodic signal, and to output the time information and the digital value in response to a second periodic signal;
a storage circuit to store the digital value in response to the second periodic signal;
a timing detection circuit to generate a detection signal indicating a timing difference between the first periodic signal and the second periodic signal based on the digital value stored in the storage circuit; and
a compensation circuit to generate adjusted time information based on the time information stored in the asynchronous first-in-first-out buffer circuit and the detection signal.

11. The circuit of claim 10, wherein the timing detection circuit generates the detection signal based on the digital value stored in the asynchronous first-in-first-out buffer circuit and the digital value stored in the storage circuit.

12. A circuit comprising:
a logic circuit that generates a digital signal in response to a first timing signal;
a first storage circuit that stores time information and a value of the digital signal in response to a second timing signal;

a second storage circuit that stores a value of the digital signal in response to the second timing signal;

a detection circuit that generates a detection signal based on the value of the digital signal stored in the second storage circuit;

a calculation circuit that calculates an offset signal indicating a timing difference between the first timing signal and the second timing signal based on the detection signal and based on the value of the digital signal stored in the first storage circuit; and an adjustment circuit that generates adjusted time information based on the time information stored in the first storage circuit and based on the offset signal, wherein the first timing signal and the second timing signal have different frequencies.

13. The circuit of claim 12, wherein the logic circuit comprises:

a first counter circuit to generate first count signals having a binary value in response to the first timing signal; and a binary-to-Gray code converter circuit to convert the binary value of the first count signals to second count signals having a Gray coded value in response to the first timing signal, wherein the second storage circuit stores the Gray coded value of the second count signals in response to the second timing signal.

14. The circuit of claim 12, wherein the detection circuit comprises a shift register to store values based on the value of the digital signal stored in the second storage circuit, and wherein the detection circuit generates the detection signal based on at least one of the values stored in the shift register.

15. The circuit of claim 12, wherein the detection circuit comprises a counter circuit to generate count signals, and wherein the counter circuit resets the count signals in response to an output signal of the second storage circuit.

16. The circuit of claim 12, wherein the logic circuit comprises:

a toggling bit generator circuit to toggle the digital signal between first and second logic states in response to the first timing signal.

17. The circuit of claim 12, wherein the detection circuit comprises a shift register to store register values, wherein each of the register values is based on the digital signal at a different time, and wherein the calculation circuit generates the offset signal based on two register values stored in adjacent flip-flops in the shift register having a same value.

18. A method comprising:

generating a digital signal in response to a first timing signal;

storing time information and a value of the digital signal in a first storage circuit in response to a second timing signal;

storing a value of the digital signal in a second storage circuit in response to the second timing signal;

generating a detection signal based on the value of the digital signal stored in the second storage circuit;

calculating an offset signal indicating a timing difference between the first timing signal and the second timing signal based on the detection signal and based on the value of the digital signal stored in the first storage circuit; and generating adjusted time information based on the time information stored in the first storage circuit and based on the offset signal, wherein the first timing signal and the second timing signal have different frequencies.

19. The method of claim 18, wherein generating a digital signal in response to a first timing signal comprises generating first count signals having a binary value in response to the first timing signal, and converting the binary value of the first count signals to second count signals having a Gray coded value in response to the first timing signal, wherein the second storage circuit stores the Gray coded value of the second count signals in response to the second timing signal.

20. The method of claim 18, wherein generating a detection signal based on the value of the digital signal stored in the second storage circuit comprises storing values in a shift register based on the value of the digital signal stored in the second storage circuit, and generating the detection signal based on at least one of the values stored in the shift register.

21. The method of claim 18, wherein generating a detection signal based on the value of the digital signal stored in the second storage circuit comprises generating count signals using a counter, and resetting the count signals in response to an output signal of the second storage circuit.

22. The method of claim 18, wherein generating a digital signal in response to a first timing signal comprises toggling the digital signal between two logic states in response to the first timing signal.

* * * * *